United States Patent [19]

Kent

[11] 4,072,031
[45] Feb. 7, 1978

[54] SECURITY APPARATUS FOR VEHICLE COMMUNICATIONS ACCESSORY

[76] Inventor: David W. Kent, 2512 Yonge St., Rockford, Ill. 61103

[21] Appl. No.: 766,571

[22] Filed: Feb. 8, 1977

[51] Int. Cl.² .......................................... E05B 73/00
[52] U.S. Cl. ........................................................ 70/58
[58] Field of Search ................ 211/4, 8; 248/27, 203; 70/18, 57, 58, 229, 230, 258, DIG. 57

[56] References Cited

U.S. PATENT DOCUMENTS

| 4,024,737 | 5/1977 | McInturff | 70/58 |
| 4,028,913 | 6/1977 | Folk | 70/58 |

Primary Examiner—Richard E. Moore
Attorney, Agent, or Firm—Leydig, Voit, Osann, Mayer & Holt, Ltd.

[57] ABSTRACT

A citizen band radio is enclosed by a strong box which is adapted to be locked releasably to a mounting bracket attached to the floor board of a vehicle.

5 Claims, 3 Drawing Figures

SECURITY APPARATUS FOR VEHICLE COMMUNICATIONS ACCESSORY

BACKGROUND OF THE INVENTION

This invention relates in general to security apparatus and more particularly to security apparatus for discouraging the theft of a vehicle communications accessory such as a citizen band radio from the vehicle. Such radios recently have attained very high popularity and, being primarily "add-on" devices rather than "built-in" devices, they are readily accessible to thieves from inside the vehicle and frequently are the targets of theft.

SUMMARY OF THE INVENTION

The general aim of the present invention is to provide new and improved security apparatus having a unique strong box which encloses a vehicle communications accessory such as a citizen band radio and which prevents unauthorized removal of the radio from the vehicle.

A further object is to provide a strong box which is adapted to be locked to a vehicle but which may be easily removed from the vehicle by the driver thereof in the event the vehicle is parked in an extremely high risk area or in the event the driver wishes to remove the radio for repair purposes or for use in a location other than in the vehicle.

The invention also resides in the provision of a unique mounting bracket for securing the strong box to the vehicle and in the novel coaction between the strong box and the mounting bracket to enable the driver to easily attach the strong box to and remove the strong box from the mounting bracket.

These and other objects and advantages of the invention will become more apparent from the following detailed description when taken in conjunction with the accompanying drawings.

DETAILED DESCRIPTION OF THE PREFERRED EMBODIMENT

Figure 1:
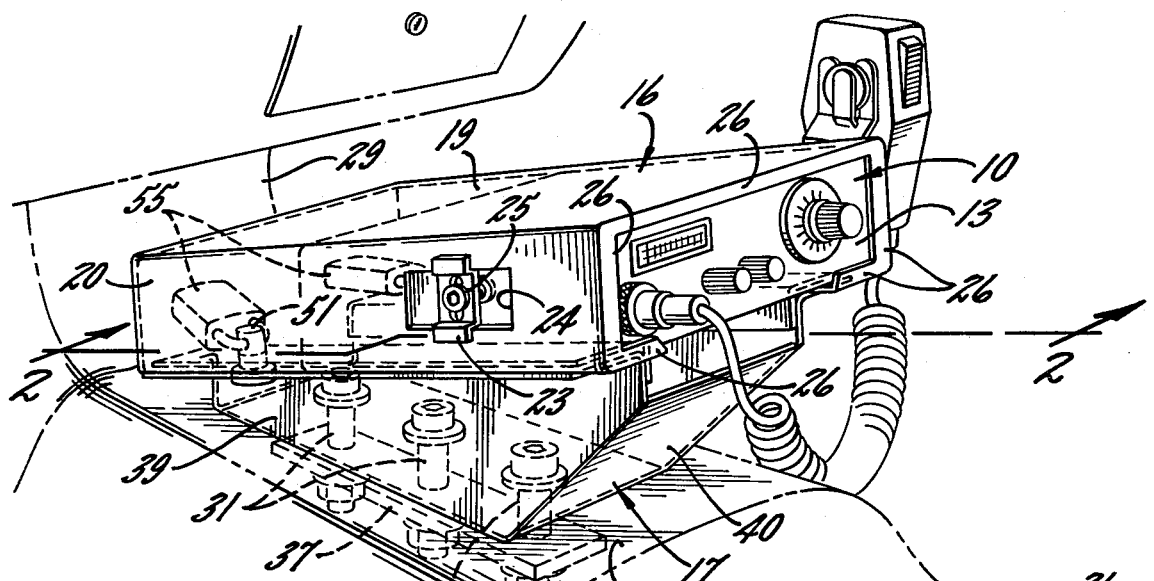
FIG. 1 is a perspective view of new and improved security apparatus incorporating the novel features of the present invention and showing the apparatus in a typical installation in a vehicle.

As shown in the drawings for purposes of illustration, the invention is embodied in security apparatus for discouraging the theft of a communications accessory 10 from a vehicle. While the security apparatus may be used with communications accessories of various types such as a tape player, the particular accessory 10 which is shown herein is a citizen band radio. Such a radio includes a case shaped generally as a parallelepiped and defined by top and bottom walls 11 and 12 (FIG. 2), front and rear walls 13 and 14 and two side walls 15. For convenience, the term "front" and similar directional terms as used herein refer to the front of the radio 10 rather than to the front of the vehicle.

In accordance with the present invention, the radio 10 is enclosed in a strong box 16 which is adapted to be securely attached to the vehicle and which renders it difficult for a thief to steal the radio from the vehicle. The strong box preferably is adapted to be locked to a mounting bracket 17 and may be easily released from the mounting bracket by an authorized person in the event that it is desired to temporarily remove the radio from the vehicle.

More specifically, the strong box 16 is made of heavy gage sheet metal and comprises a top wall 19 (FIG. 3) and two upright side walls 20. Formed integrally with and projecting inwardly from the lower margins of the side walls 20 are flanges 21 which underlie the bottom wall 12 of the radio 10. The rear of the box 16 is open and the box is of such size that the radio may be telescoped into the box from the rear thereof. Slotted clips 23 (FIGS. 1 and 2) are fitted within openings 24 in the side walls 20 of the box and receive screws 25 which are threaded into the conventional holes usually formed in the side walls 15 of the radio. The screws 25 may be adjusted in accordance with the size of the radio and serve to prevent the radio from shifting from side-to-side within the box. The screws also prevent the radio from sliding rearwardly within the box.

In carrying out the invention, lips 26 (FIGS. 1 and 2) are formed integrally with the top wall 19, the side walls 20 and the flanges 21 of the strong box 16 and project inwardly across the front margins of the radio 10. Thus, the lips 26 engage the front wall 13 of the radio and prevent the radio from being pulled out of the strong box through the front thereof.

While the strong box 16 could be anchored directly to the floor board 27 of the vehicle with the rear of the box located next to the firewall 29, it is preferred to utilize the mounting bracket 17 in order to enable the box and the radio 10 to be removed from the vehicle by an authorized person. In the present instance, the mounting bracket 17 is located on top of the "hump" of the vehicle and comprises a bottom plate 30 (FIGS. 2 and 3) which is anchored to the floor board 27 by three screws 31 having a flat washer 33 (FIG. 2) located adjacent its head and each having two flat washers 34, a lock washer 35 and a nut 36 located beneath the floor board. Preferably, a metal strap 37 is disposed immediately adjacent the underside of the floor board to reinforce the latter and to reduce the danger of a thief prying the bracket 17 away from the floor board.

The mounting bracket 17 also includes two generally triangular side walls 39 and a forwardly inclined front wall 40. The walls 39 and 40 are formed integrally with and project upwardly from the bottom plate 30 and, together with the box 16, enclose the heads of the screws 31 so as to prevent a thief from gaining access to the screws. Even if access is gained to the screws, a thief still would have difficulty in removing the bracket 17 since the nuts 36 will turn simultaneously with the screws and since the nuts cannot be held except from beneath the vehicle.

Figure 2:
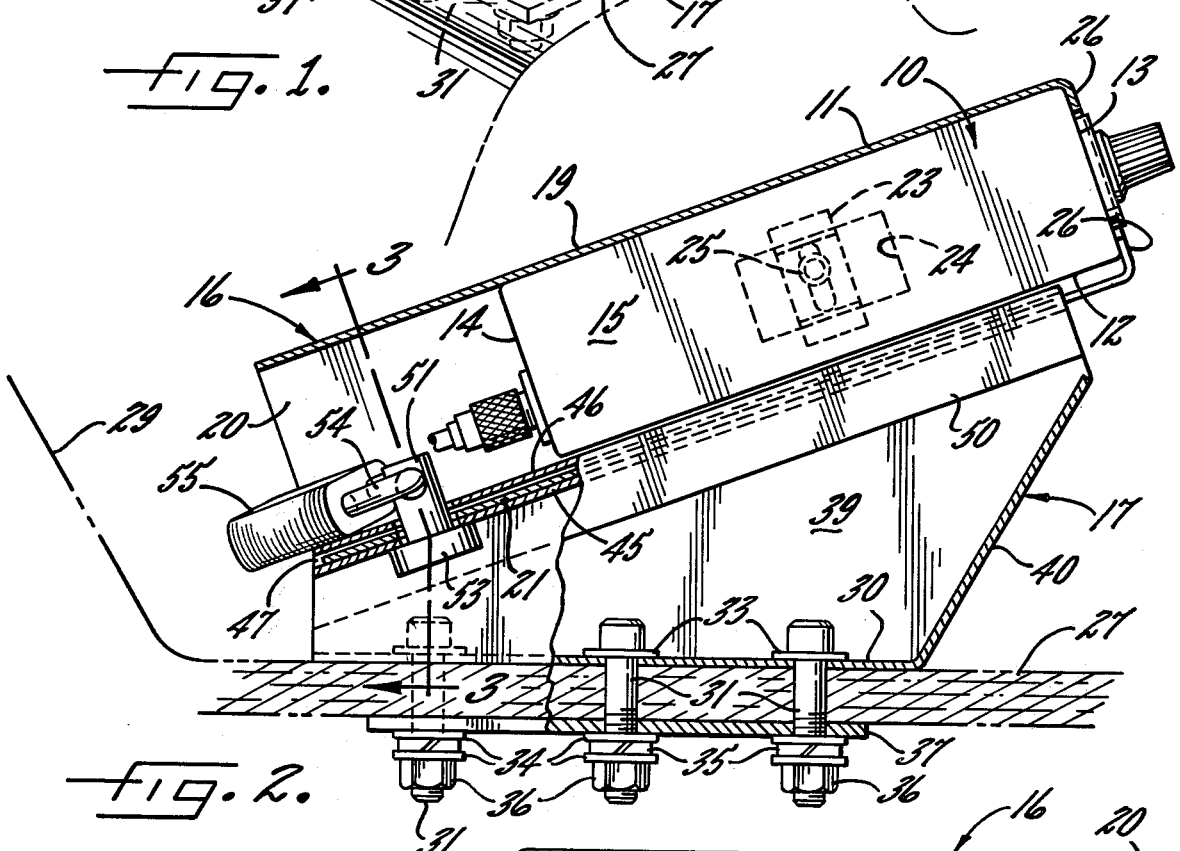
FIG. 2 is an enlarged fragmentary cross-section taken substantially along the line 2—2 of FIG. 1.
Figure 3:
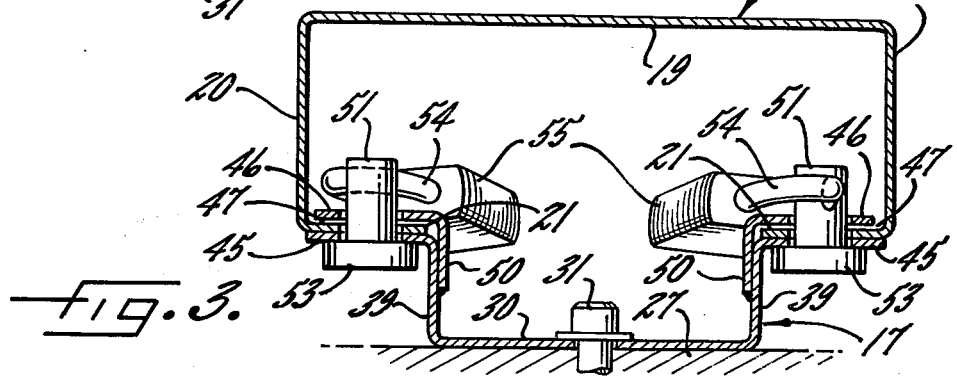
FIG. 3 is a cross-section taken substantially along the line 3—3 of FIG. 2.

Pursuant to the invention, means are provided on the upper margins of the side walls 39 of the mounting bracket 17 for slidably receiving the flanges 21 of the strong box 16. Herein, the means on each side wall 39 comprise a shelf 45 (FIG. 3) and an overlying plate 46 which coact to define an outwardly and forwardly opening channel 47, the flanges 21 of the box 16 being adapted to be slid into the channels from the front of the mounting bracket 17. Each shelf 45 is in the form of a flange which is formed integrally with and which projects outwardly from the upper margin of the associated side wall 39. Each plate 46 is spaced a short distance above its respective shelf 45 and is formed integrally with a depending leg 50 which is welded to the inner side of the side wall 39. Thus, the shelves 45 and the plates 46 define the channels 47 for receiving the flanges 21 of the box 16 and serve to hold the box in a fixed vertical position. The walls 39 and the shelves 45 are designed such that the box is supported in an inclined position as shown in FIGS. 1 and 2 in order to facilitate viewing of the front of the radio 10. In addition, the bracket 17 locates the rear of the box near the floor board 27 and the firewall 29 so as to prevent the radio 10 from being slid out of the rear of the box.

After the radio 10 has been placed in the box 16 and after the flanges 21 of the box have been slid into the channels 47 from the front side of the bracket 17, the box is securely locked to the bracket in order to prevent a thief from removing the box and the radio. For this purpose, a pin 51 is inserted through aligned holes formed in the rear portion of each shelf 45, the overlying flange 21 and the associated plate 46, each pin having a lower head 53 which engages the underside of the shelf. The shackle 54 of a key-operated padlock 55 then is slipped through a hole in the upper end portion of each pin and is closed so as to prevent unauthorized removal of the pin. Thus, the pins 51 secure the box 16 to the bracket 17 while the locks 55 enable the pins to be removed only by an authorized person. The pins also will engage the rear wall 14 of the radio 10 and prevent the radio from being removed out of the rear of the box in the event that the box should happen to be located such that the floor board 27 and/or firewall 29 do not prevent such removal.

From the foregoing, it will be apparent that the present invention brings to the art a new and improved strong box 16 which encloses a radio 10 or other vehicle communications accessory and serves to discourage theft. The novel relationship between the box and the mounting bracket 17 enables the box and the radio to be easily removed from and re-installed in the vehicle by an authorized person. It will be appreciated by those familiar with the art that the bracket need not necessarily be mounted on the floor board 27 but could be used in an overhead installation in a truck or the like. Also, various bracket arrangements can be provided to enable the strong box and the radio to be mounted in an upright position on the floor of a truck or other vehicle.

I claim:

1. Security apparatus for a vehicle communications accessory havinfg a case shaped generally as a parallelepiped and defined by top, bottom, front, rear and side walls, said apparatus comprising a box having a top wall and having first and second side walls sized and shaped to telescopically receive said case, the rear of said box being open to permit said case to be telescoped into said box from the rear thereof, lip means on the front of said box and engageable with the front wall of said case to prevent said case from being removed out of the front of said box, first and second flanges projecting inwardly from said first and second side walls, respectively, of said box and underlying the bottom wall of said case, a mounting bracket having front and rear sides, means for anchoring said mounting bracket to the floor of a vehicle, said mounting bracket having first and second shelves underlying said first and second flanges, respectively, and having first and second plates overlying said first and second flanges, respectively, each shelf and its overlying plate defining a forwardly and outwardly opening channel for receiving the respective flange with said flanges being adapted to be slid into said channels from the front side of said mounting bracket, a first pin extending removably through said first shelf, said first flange and said first plate, a second pin extending removably through said second shelf, said second flange and said second plate, said pins being engageable with the rear wall of said case to prevent said case from being removed from the rear of said box, and first and second security locks connected to said first and second pins, respectively, and preventing unauthorized removal of said pins from said shelves, flanges and plates whereby said pins connect said box to said mounting bracket while said locks prevent unauthorized removal of said box from said bracket.

2. Security apparatus for a vehicle communications accessory having a case shaped generally as a parallelepiped and defined by top, bottom, front, rear and side walls, said apparatus comprising a box having a top wall and having first and second side walls sized and shaped to telescopically receive said case, the rear of said box being open to permit said case to be telescoped into said box from the rear thereof, inwardly projecting lip means on the front of said box and engageable with the front wall of said case to prevent said case from being removed out of the front of said box, first and second flanges projecting from the margins of said first and second side walls, respectively, and means connected to said flanges for anchoring the latter to a vehicle.

3. Security apparatus as defined in claim 2 further including a mounting bracket adapted to be anchored to the vehicle, said means comprising a pin extending through said mounting bracket and one of said flanges, and a security lock connected to said pin and preventing unauthorized removal of said pin from said one flange and said mounting bracket whereby said pin connects said box to said mounting bracket while said lock prevents unauthorized removal of said box from said bracket.

4. Security apparatus as defined in claim 2 further including a mounting bracket adapted to be anchored to the vehicle, said means comprising first and second pins extending through said first and second flanges, respectively, and also extending through said mounting bracket, and first and second security locks connected to said first and second pins, respectively, and preventing unauthorized removal of said pins from said flanges and said bracket whereby said pins connect said box to said bracket while said locks prevent unauthorized removal of said box from said bracket.

5. Security apparatus as defined in claim 4 in which said first and second flanges project inwardly from said first and second side walls, respectively, and underlie the bottom wall of said case, said mounting bracket having first and second shelves underlying said first and second flanges, respectively, and having first and second plates overlying said first and second flanges, respectively, each shelf and its overlying plate defining a forwardly and outwardly opening channel for receiving the respective flange with said flanges being adapted to be slid into said channels from the front side of said mounting bracket, said first pin extending removably through said first shelf, said first flange and said first plate, and said second pin extending removably through said second shelf, said second flange and said second plate.

* * * * *